C. SCHOCK.
FOOD CHOPPER.
APPLICATION FILED SEPT. 29, 1913.
1,130,024.
Patented Mar. 2, 1915.
3 SHEETS—SHEET 1.
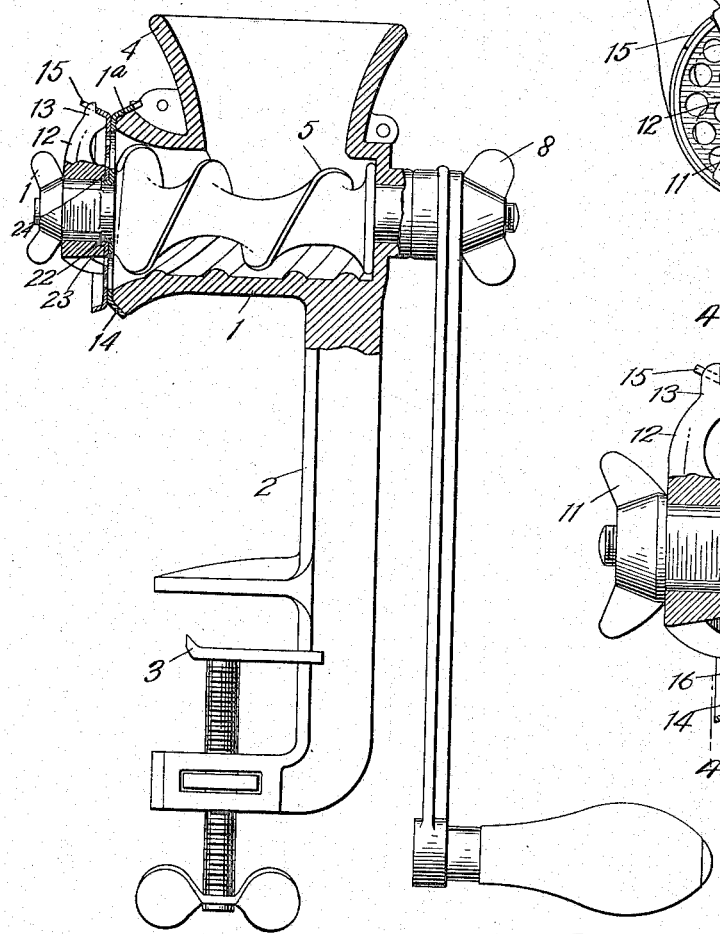
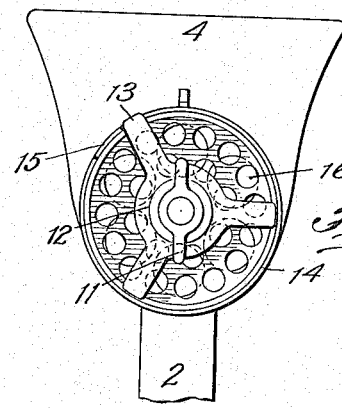
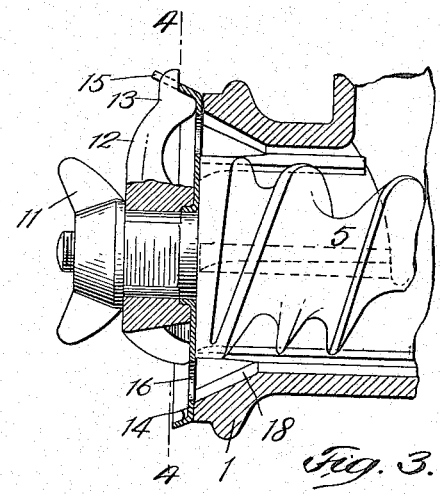
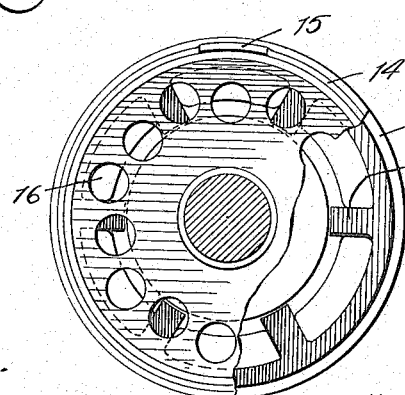

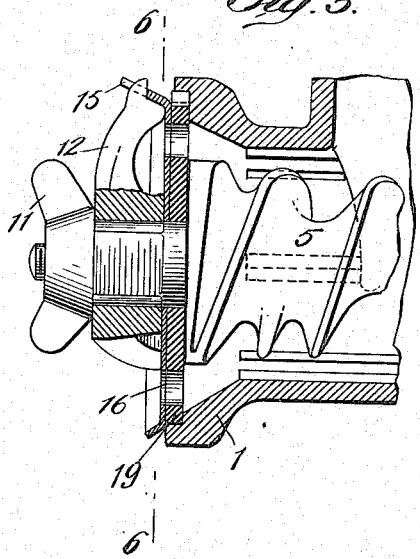
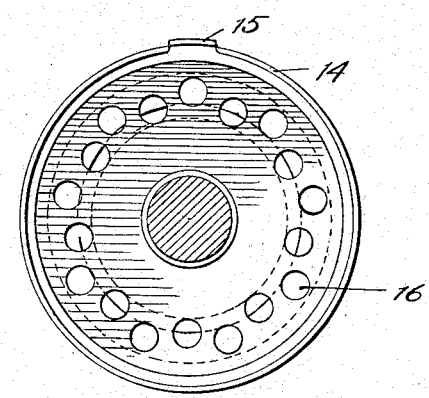
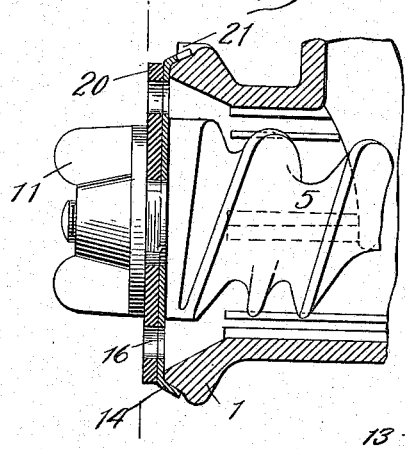
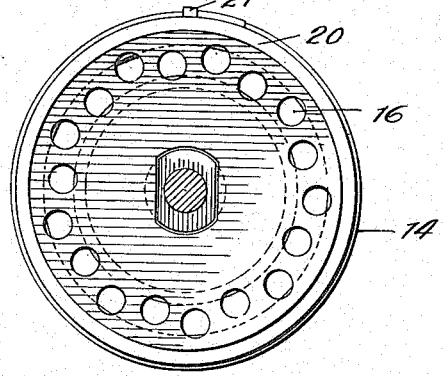
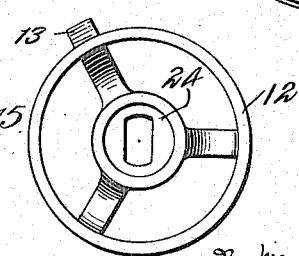

C. SCHOCK.
FOOD CHOPPER.
APPLICATION FILED SEPT. 29, 1913.
1,130,024.
Patented Mar. 2, 1915.
3 SHEETS—SHEET 3.
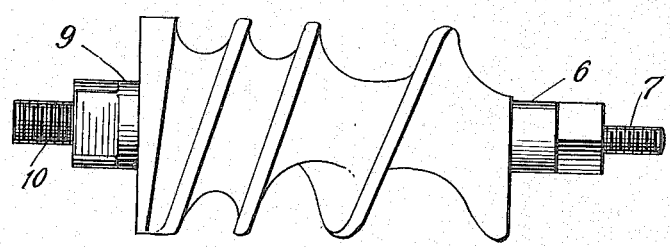
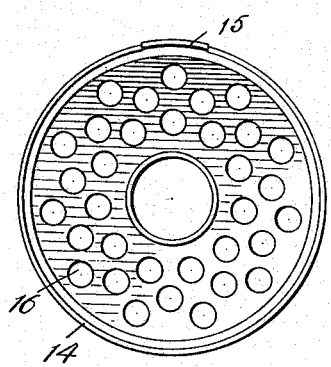
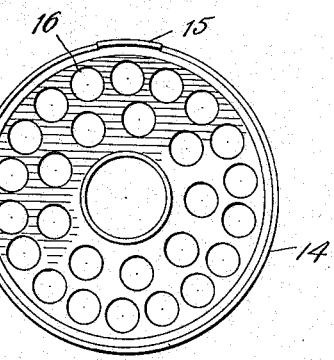
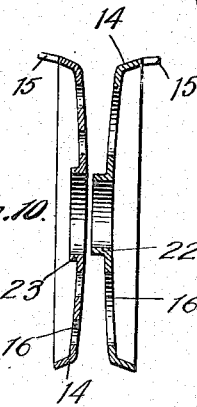
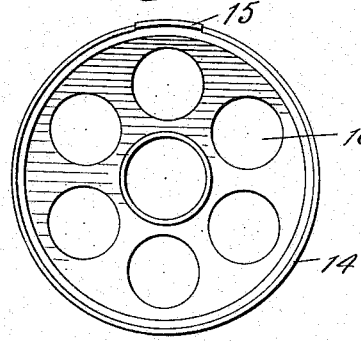
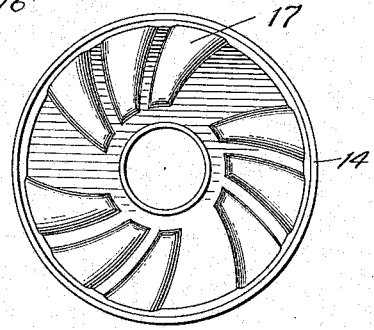

UNITED STATES PATENT OFFICE.

CLARENCE SCHOCK, OF MOUNT JOY, PENNSYLVANIA.

FOOD-CHOPPER.

1,130,024.  Specification of Letters Patent.  Patented Mar. 2, 1915.

Application filed September 29, 1913. Serial No. 792,314.

*To all whom it may concern:*

Be it known that I, CLARENCE SCHOCK, residing at Mount Joy, in the county of Lancaster and State of Pennsylvania, have invented certain new and useful Improvements in Food-Choppers, of which the following is a specification.

This invention relates to food choppers comprising one or more rotary cutters which coöperate with other cutters to chop the food. Food choppers in which my invention may be embodied usually comprise a barrel provided with a hopper into which and through which the food is forced by means of a feed-worm or forcer operated at one end of the barrel through a handle, together with some mechanism toward the front end of the barrel for severing the food as it is forced there-through. There is also, of course, provided suitable means for supporting the barrel and for fastening it to a table or other stationary object. In some instances one cutter is arranged stationary with respect to the barrel or may be formed integral with the end of the barrel, and an additional cutter or cutters associated with the feed-worm or forcer are arranged to revolve against the stationary cutter. And the cutters are preferably metal disks having holes through their faces, the edges of the holes serving to cut the food as it is forced past the cutters.

Stationary and rotary cutters for attachment to food choppers have usually heretofore been made disk-shaped and of cast metal or relatively thick steel stampings from .125 to .150 of an inch in thickness. In order that these disks may be of sufficient strength to withstand the thrust of the food against them and the thrust of the feed-worm through its tendency to travel forwardly, they are made relatively thick and therefore present large surfaces through which the food must pass. The edges of the perforations of these relatively thick disks cannot be conveniently and inexpensively sharpened and because of the thickness of the disks considerable surface is presented to the food as it is forced through the perforations and the friction incidental to these thick disks is detrimental to easy operation of the choppers. In order to produce sufficiently sharp edges to the perforations, these heretofore relatively thick cutters were machined, ground and polished, and since it is necessary for the perfect operation of such devices that opposing cutters contact throughout their surface areas, considerable care must be exercised in order that their surfaces might be true. This can only be accomplished through expensive methods of manufacture and through the use of greater quantities of metal than is ultimately necessary for the production of successfully operable disks.

It is a desideratum in the art to which the present invention relates to produce a food chopper in which the friction of the food through the cutters is minimized, with the result that there will be less thrust upon them, and to produce a food chopper having cutters which will overcome the inherent disadvantages of the heretofore known metal cutters and which may be inexpensively manufactured and sold.

The present invention provides a food chopper having a cutter which may be made of sheet-metal approximately .030 to .040 of an inch in thickness, which may be flexible, which may be inexpensively and accurately made without the necessity of machining to produce satisfactory cutting edges, and which may be used in several different relations, coöperating either with cutters on the ends of barrels of food choppers, with stationary or rotary cutters of the same type as themselves, or with heretofore known cutters now to be found upon the market, to chop the food.

In the specific embodiment of my invention hereinafter referred to for the sake of exposition the cutter is provided with an integral reinforcing flange; specifically the flange is obliquely disposed to the face of the disk, and the face of the disk is preferably concaved or bulged to a slight extent in order that there may be a resilient action when the disks are used and in order that such disks may be adjusted to advantage to bring the shearing edges into operative contact.

When two reinforced cutters are used, one is arranged against rotation with its convexed side outwardly and the other is arranged for rotation with the worm with its convexed side inwardly, and an adjusting member, such as a spider having arms to engage the periphery of the outer disk or to lock with a winged nut, may be used to tighten the disks to a shearing contact. When one rotary cutter is used against the face of a barrel provided with knife edges or in connection with a different form of stationary cutter, such, for instance, as the usual relatively thick cutter, it may be operated directly through the worm. When a stationary reinforced cutter is used, it may be locked to the casing or barrel in any desired manner and thus coöperate with a rotary cutter of another form to chop the food. The invention, therefore, also consists in the combination of such cutters and choppers properly arranged for coöperation, all as more fully hereinafter set forth and as claimed.

In the accompanying drawings showing several forms of reinforced cutters in different combinations, Figure 1 is a vertical section through a complete chopper embodying two reinforced disks, the inner one held stationary and the outer one associated to rotate with the worm; Fig. 2 is a plan view of the front end of the chopper shown in Fig. 1; Fig. 3 is a segmental, vertical, longitudinal section through a barrel having integral cutters upon its outer end and a reinforced disk associated to rotate with the worm; Fig. 4 is a front plan view of Fig. 3; Fig. 5 is a segmental, longitudinal section through a barrel having a stationarily arranged old-style cast-metal or thick stamped steel inner cutter and an outer, reinforced cutter associated to rotate with the worm; Fig. 6 is a section along line 6—6 of Fig. 5; Fig. 7 is a segmental, longitudinal section through a barrel having an inner stationary reinforced disk and an outer disk; Fig. 8 is a section along line 8—8 of Fig. 7; Fig. 9 is a detail of the worm or forcer; Fig. 10 is a transverse section through a reinforced cutter; Figs. 11, 12, 13 and 14 are front plan views of cutters having different forms of cutting openings and grinding faces; and Fig. 15 is a plan view of the yoke.

Referring to the drawings, 1 indicates the barrel of a food chopper which may be of any desired construction and 2 the standard or support therefor having the clamping device 3 for attaching the chopper to an edge of the table in the well understood manner. 4 is the usual hopper through which the food is fed, and 5 the worm which is provided with the shaft 6 and screw-threaded end 7 for engagement of the winged nut 8. The outer end of the worm is provided with a circular portion 9, upon which an inner disk having a central opening corresponding to such portion may be seated to permit the shaft of the worm to rotate therein and a flattened portion to fit a rotary yoke or outer cutter. The worm has an outward threaded end 10 to which the winged nut 11 may be attached for holding the outer cutter against the inner cutter. This may be done through a yoke 12 having at least one arm 13 long enough to engage an extension of the disk to be rotated. The end of the barrel may be cast with a beveled face 1ª to obtain a close contact of the inner disk without the necessity of machining any of the parts. The reinforced disks are relatively thin and are provided with the preferably obliquely disposed reinforcing flanges 14 and the additional lug 15 for engagement with the long arm of the yoke. These disks are preferably slightly convexed and in use are preferably adjusted on the worm with their convexed sides abutting the cutter with which they are to coöperate. The faces of the disks within the boundaries of flanges 14 comprise the cutting edges 16, which are formed by stamping out a plurality of holes during the same operation by which the disks are made.

Fig. 13 shows a disk for use in making nut butter and the like and has abrading surfaces 17 which may be formed during the operation of stamping the cutter.

Figs. 11, 12 and 14 show perforations of different sizes for grinding different characters of food. The disks are resilient and therefore may be adjusted when used in connection with the yoke or similar operating means.

The reinforced disks may be used in innumerable relations. In Fig. 3 I have shown an old-style barrel having cutting edges 18 integral with the end of the barrel and a reinforced sheet-metal disk arranged through the yoke to coöperate therewith. In Fig. 5 there is shown an old-style barrel having a stationary thick steel inner disk 19 and an outer rotary, reinforced sheet-metal disk. In Fig. 7 there is shown an old-style barrel having an outer, rotary, cast-metal or thick stamped steel disk 20 and an inner, reinforced, sheet-metal disk held stationary with respect to the end of the barrel through engagement of the lug 15 on the disk and ear 21 on the barrel. If desired, the tension of the flexible disks may be regulated through the nut 8 on the end of the handle, as well as through the nut 11 and the yoke 12.

By forming the disks in the above described manner, they may be readily interchanged and either one will fit snugly against the beveled exit end of the barrel. When two of the resilient disks are used together they are placed upon the end 9 of the worm with their convexed faces abutting. When only one of the resilient disks is used the convexed side is placed preferably to abut against the cutting surface of the barrel or cutter with which it coöperates.

The inner disk may be provided with a central circumferential bearing flange 22 and the outer disk with the corresponding flange 23, in which event the yoke should be recessed, as shown at 24. This construction is very advantageous for some purposes and forms the subject-matter of a separate application filed by me on May 21st, 1912, Serial Number 698,708, patented February 24, 1914, Number 1,088,458, and therefore is not claimed in this application.

I am aware that sheet-metal cutters have heretofore been known and I do not broadly claim such construction, but I believe myself to be the first to produce sheet-metal cutters carrying reinforcing elements adapting the cutters for use in food choppers and to withstand the strains incidental to their use. Tin graters and cutting knives may have been heretofore known and used, but these devices are not used in connection with food choppers and are not subjected to the tremendous strains thereof. The flanges which may be an incidental part of the construction of such graters and cutters are usually made to adapt the devices to conform with the receptacle in which they are used and they therefore have no bearing upon the present invention. I am also aware that food choppers having outer stationary knives struck into cup-shaped form have been known, but such stationary cutters have been materially weakened by grooves or the like formed in the turned-over edges for attaching them to lugs or the like on the ends of the choppers and therefore they are not reinforced cutting disks in the sense that I use such term in this specification.

In my reinforced cutters it is only necessary to stamp the cutter and form it and its flexibility permits bringing them into close contact with each other and, in addition to this, the original smooth, cold, rolled surface of the thin steel from which they are made and which is a much better surface than can be produced by any possible practicable process of grinding is preserved. The concavo-convex form of the reinforced cutter makes it possible to harden by a proper hardening process without distorting their shape so as to interfere with bringing their cutting faces into a close shearing action. Old cutters stamped out of thick metal must be ground to a true surface. If they are ground before hardening, the hardening process will warp them out of shape, and if ground after hardening, the grinding process will take off the hard shell put on by the hardening process and they will not have as hard and durable cutting edges.

What I claim is:—

1. The combination with a food chopper having a barrel and a rotary forcer operable therein, of cutters associated with the forcer, at least one of said cutters being resilient and provided with an integral reinforcing element.

2. The combination with a food chopper having a barrel and a forcer operable therein, of cutters associated with the barrel and forcer in such manner as to receive the thrust of the food being cut, at least one of said cutters being a resilient disk having an integral peripheral reinforcing flange.

3. A cutter disk having an integral peripheral reinforcing element the boundary of which is substantially continuous.

4. In a food chopper, a resilient cutter disk having an obliquely disposed reinforcing flange.

5. In a food chopper, a resilient cutter disk having an obliquely disposed, circumferential, reinforcing flange.

6. In a food chopper, a rotary forcer, a cutter disk having a convexed face and an integral reinforcing element adapting the disk to withstand the thrust of said forcer.

7. The combination with a food chopper having a rotary forcer and a stationary cutter, of a rotary cutter associated with the forcer having shearing edges on its face and a circumferential flange bounding said shearing edges.

8. The combination with a food chopper having a rotary forcer and a stationary, reinforced cutter, of a rotary cutter associated with the forcer having shearing edges on its face and a circumferential, reinforcing flange bounding said shearing edges.

9. The combination with a food chopper having a rotary forcer and a stationary cutter, of a rotary cutter associated with the forcer having shearing edges on its face and a circumferential, obliquely disposed, reinforcing flange bounding said shearing edges.

10. The combination with a food chopper having a rotary forcer and a cutter, of a metal disk adapted to coöperate with such cutter to chop the food and having means on its periphery for engaging a rotative element, and a rotative element associated with a worm arranged to engage said means to rotate said disk.

11. In a food chopper, cutting mechanism comprising outer and inner peripherally flanged cutters and means for rotating one of said cutters relative to the other.

12. In a food chopper, cutting mechanism comprising an outer peripherally flanged resilient cutter, an inner cutter coöperating therewith, and means for rotating one cutter relative to the other.

13. In a food chopper, cutting mechanism comprising a stationary inner cutter, a revoluble, peripherally, flanged, outer cutter coöperating therewith, and means for operating said revoluble flanged cutter.

14. In a food chopper, cutting mechanism comprising a stationary cutter, a revoluble, flanged, outer cutter coöperating therewith, means on the revoluble cutter for engaging operating means, operating means comprising a yoke adapted to engage the revoluble cutter, and mechanism for rotating said yoke and thus said revoluble cutter.

15. In a food chopper, a pair of convexed disks, each having a circumferential flange and a stop lug carried by each of the flanges, a feed worm, means co-acting with the lug of one of the disks for holding it stationary, and means co-acting with the lug of the other disk and with the feed worm for rotating the last said disk against the stationary disk.

16. In a food chopper having a barrel, a stationary cutter having an oblique circumferential flange engaging the outer edge of the barrel.

In testimony whereof, I have hereunto set my hand this 26th day of September, 1913, in the presence of subscribing witnesses.

CLARENCE SCHOCK.

Witnesses:
H. M. STAUFFER,
CHRIST WALTERS.

Copies of this patent may be obtained for five cents each, by addressing the "Commissioner of Patents, Washington, D. C."